United States Patent
Wong (10) Patent No.: US 9,113,740 B2
(45) Date of Patent: Aug. 25, 2015

(54) MULTI-PURPOSE JUICER

(76) Inventor: Yan Kwong Wong, Hong Kong (CN)

(*) Notice: Subject to any disclaimer, the term of this patent is extended or adjusted under 35 U.S.C. 154(b) by 681 days.

(21) Appl. No.: 13/328,451

(22) Filed: Dec. 16, 2011

(65) Prior Publication Data

US 2013/0000494 A1 Jan. 3, 2013

(30) Foreign Application Priority Data

Jun. 29, 2011 (CN) .................. 2011 2 0228392 U (51) Int. Cl.
*A47J 19/02* (2006.01)

(52) U.S. Cl.
CPC .................................... *A47J 19/025* (2013.01)

(58) Field of Classification Search
CPC ............................. A47J 19/022; A47J 19/025
USPC .................................................. 99/505, 495
See application file for complete search history.

(56) References Cited

U.S. PATENT DOCUMENTS

| | | | |
|---|---|---|---|
| 5,906,154 A * | 5/1999 | Yoon et al. | 99/510 |
| 2002/0088352 A1* | 7/2002 | Yip | 99/495 |
| 2002/0104446 A1* | 8/2002 | Arai | 99/495 |
| 2007/0277682 A1* | 12/2007 | Wong | 99/495 |

* cited by examiner

*Primary Examiner* — Tu B Hoang
*Assistant Examiner* — Thomas Ward
(74) *Attorney, Agent, or Firm* — Arash Behravesh; Mannava & Kang, P.C.

(57) ABSTRACT

The present invention relates to a multi-purpose juicer, which includes a frame assembly, a base assembly, and a drive assembly. The frame assembly includes a frame body, a head assembly fixed on the base assembly, and a function element. A terminal of the frame body matches with the head assembly to form an operation cavity for containing the function element. Another terminal thereof matches with the drive assembly such that the drive assembly drives the function element to operate in the operation cavity. The drive assembly can directly drive the function element to rotate it in the operation cavity. The function element may be altered according to different needs; however, other elements need not to be altered, thus the whole structure thereof is simple.

8 Claims, 7 Drawing Sheets

MULTI-PURPOSE JUICER

CROSS REFERENCE

The present application claims the benefit of CN 201120228392.9 filed on Jun. 29, 2011, which is incorporated herein by reference in its entirety.

TECHNICAL FIELD

The present invention relates to a multi-purpose juicer, and more particularly to a multi-purpose juicer having a suction cup base to fix a frame thereof, wherein the multi-purpose juicer includes a hand-actuated juicing device.

BACKGROUND

Juicers are used as a tool for juicing the vegetable and/or fruit. Currently, juicers are divided into two categories: hand-actuated juicers and power-driven juicers. Each of these two types of juicers juice the vegetable and/or fruit by one of the two following methods. In the first method, vegetables and/or fruits are pressed on the juicer by hand, thus the juice flows down and passes through a filter to separate the pomace from the juice. This method is disadvantageous because it is only suited for vegetables or fruits whose juice can be extracted by crushing the ascoma thereof. In the second method, the juicer requires placing the sarcocarp without the pericarp into the churning blades of the juicer to juice the fruits. This method is also disadvantageous because it requires an additional process to separate the pomace from the juice. Accordingly, a single juicer cannot be used to juice different vegetables and/or fruits.

To solve the above disadvantages, hand-actuated multi-purpose juicers have been developed for juicing different vegetables and/or fruits. A typical multi-purpose juicer includes a base assembly, a drive assembly having a hand grip, a frame assembly, and a function/juicing assembly. The juice vegetables and/or fruits, the hand grip of the drive assembly is churned back and forth to drive a threaded rod of the frame and juicing assemblies to rotate, such that the pressed vegetables and/or fruits are juiced by the blades of the juicing assembly. However, these multi-purpose juicers are complex, and have many different parts that can break; therefore, they are not very reliable. Furthermore, because of their complexity, it is difficult to replace the damaged parts or determine the cause of error.

SUMMARY

The present invention provides a multi-purpose juicer with a simple structure that is reliable and can easily determine the cause of error.

The present invention provides a multi-purpose juicer that includes a frame assembly, a base assembly arranged under the frame assembly, and a drive assembly arranged at a side of the frame assembly.

The present invention provides that the frame assembly includes a frame body, a head assembly fixed on the base assembly, and a function element, wherein the frame body includes (i) a bottom that matches with the base assembly, (ii) a first end that matches with the head assembly to form an operation cavity configured for receiving the function element, (iii) a second end that matches with the drive assembly, and wherein the drive assembly drives the function element to operate in the operation cavity.

The present invention provides that the frame body includes a lateral cylinder-shaped transferring zone and a feeding zone arranged on the transferring zone.

The present invention provides that wherein the transferring zone comprises a transferring cavity that is in communication with the feeding zone, wherein the head assembly includes a processing cavity, and wherein the combination of the transferring cavity and the processing cavity form the operation cavity.

The present invention provides that lateral guiding ribs are formed on an inner wall of the transferring cavity.

The present invention provides that the head assembly includes a head body cooperating with the frame body to form the operation cavity, a jam nut configured to fix the head body at a terminal of the frame body, and a seal gasket arranged between the head body and frame body.

The present invention provides that the processing cavity includes plug holes on its walls and wherein a plurality of locating fasteners are arranged between the head body and the frame body to position the plug holes at a lowest location of the processing cavity.

The present invention provides that the head body further includes a guide plate arranged under the plug holes.

The present invention provides that the function element includes a locating terminal cooperating with the head body and a driving terminal cooperating with the drive assembly, a locating central hole is arranged in the head body and rotatably cooperates with the locating terminal of the function element, and a drive-connecting arranged in the frame body and rotatably cooperates with the driving terminal of the function element.

The present invention provides that the function element further includes a demountable juicing threaded rod comprising a rotation shaft rotatably arranged in the operation cavity, and a spiral wale arranged on a surface of the rotation shaft.

The present invention provides that the spiral wale includes an outer convex and wherein a portion of the outer convex includes a tooth-shaped surface that corresponds to the transferring zone of the frame body.

The present invention provides that the tooth-shaped surface includes a top that is arranged in the outer convex surface of the spiral wale.

The present invention provides that the rotation shaft includes a spiral outthrust group that is arranged on its surface and in an interval with the spiral wale.

The present invention provides that the head assembly further includes a humidity regulator arranged on the head body, and wherein the humidity regulator is configured to adjust a location of the function element in an axial direction in relation to the head body.

The present invention provides that the drive assembly is arranged at a side of the frame body and comprises a rotatable supporter fixed on the frame body and a handle group, wherein the handle group is rotatably arranged in the rotatable supporter and is connected to a driving terminal of the function element.

The present invention has many following advantages. The frame assembly comprises the frame body, the head assembly and the function element, and the function element is rotatably arranged in the operation cavity between the head assembly and the frame body, such that the drive assembly can directly drive the function element to rotate in the operation cavity. The function element may be altered according to different needs, and others thereof need not to be altered. Thus the whole of the juicer is simple. Furthermore, the present invention can replace different function elements according to different needs, to perform multi purposes for juicing different vegetables and/or fruits. The function element may be a juicing threaded rod. Therefore, the present invention can use different threaded rods with different size according to different needs, or replace different threaded rods according to different-type vegetable and/or fruit.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
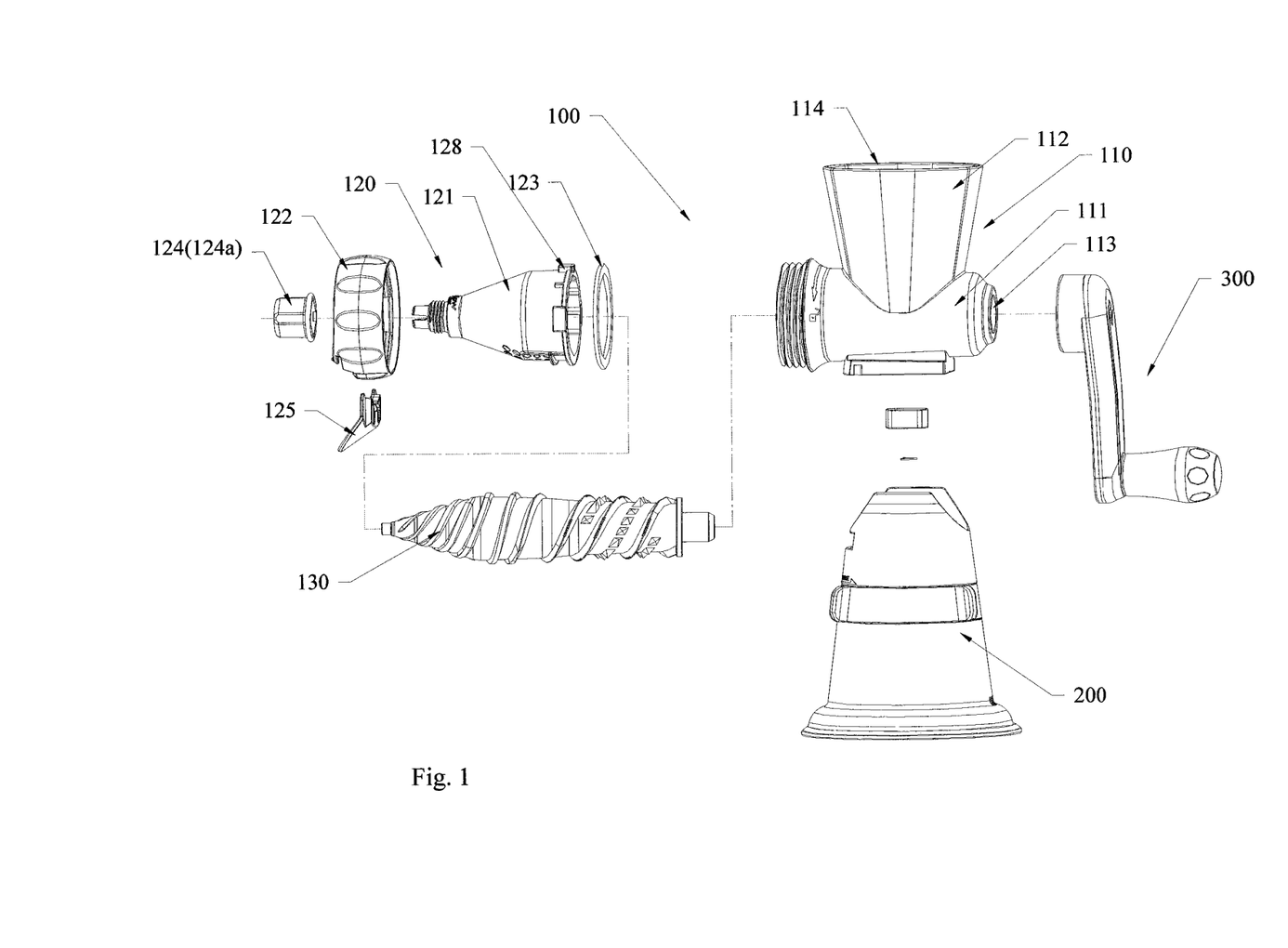
FIG. 1 is an exploded schematic view of a multi-purpose juicer in accordance with an exemplary embodiment of the present invention.

FIG. 1 is an exploded schematic view of a multi-purpose juicer in accordance with an exemplary embodiment of the present invention. As shown in FIG. 1, the multi-purpose juicer of the present invention can include a frame assembly 100, a base assembly 200, and a drive assembly 300. The frame assembly 100 can be fixed on the base assembly 200 and the drive assembly 300 is arranged at a side of the frame assembly 100. The drive assembly 300 is capable of driving the frame assembly 100 and processing the material and the base assembly 200 is configured to stabilize/secure the multi-purpose juicer and prevent the frame assembly 100 from wobbling when processing the material.

Figure 6:
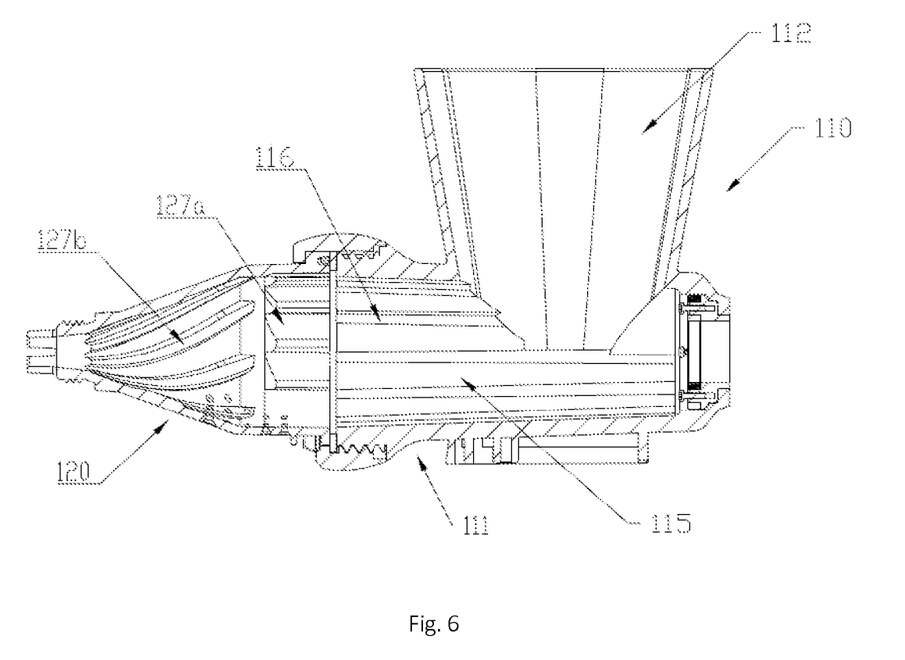
FIG. 6 is a partial sectional view of a combination of frame body and head assembly of the multi-purpose juicer in accordance with an exemplary embodiment of the present invention.

In an exemplary embodiment of the present invention, the frame assembly 100 can include a frame body 110, a head assembly 120 secured on the frame body 110, and a function element arranged in an operation cavity that is formed within or between the frame body 110 and the head assembly 120 (preferably a head body of the head assembly 120). The bottom portion of the frame body 110 can be aligned with or matched with the base assembly 200, a first end/terminal of the frame body 110 can be aligned with or matched with the head assembly 120, and a second end/terminal of the frame body 110 can be aligned with or matched with the drive assembly 300. In detail, the frame body 110 can include a transferring zone 111 and a feeding zone 112. The transferring zone 111 can be lateral and cylinder-shaped. The feeding zone 112 can be vertical and funnel-shaped. Additionally, the feeding zone 112 can be arranged on the transferring zone 111. A first end/terminal of the cylinder-shaped transferring zone 111 can be connected with the head assembly 120, having processing cavity 126 (shown in FIG. 2), such that the combination of the two forms the operation cavity. As stated above, the operation cavity can include the function element that is responsible for juicing or meat-mincing operation. A second end/terminal of the transferring zone 111 can be connected with the drive assembly 300 that drives the function element. The transferring zone 111 of the frame body 110 can include a drive-connecting hole 113. Preferably, the drive-connecting hole 113 is positioned such that the function element can pass through the drive-connecting hole 113 and connect with the drive assembly 300. The feeding zone 112 can include a feeding open 114 that is in communication with a transferring cavity 115 (shown in FIG. 6) that is within the transferring zone 111. The combination of the transferring cavity 115 and the processing cavity 126 form the operation cavity that is capable of receiving/containing the function element.

To conveniently guide the material, lateral guiding ribs 116 (shown in FIG. 6) may be formed on walls of the transferring cavity 115. Preferably, the lateral guiding ribs 116 are parallel to a direction of the material being transferred.

Figure 2:
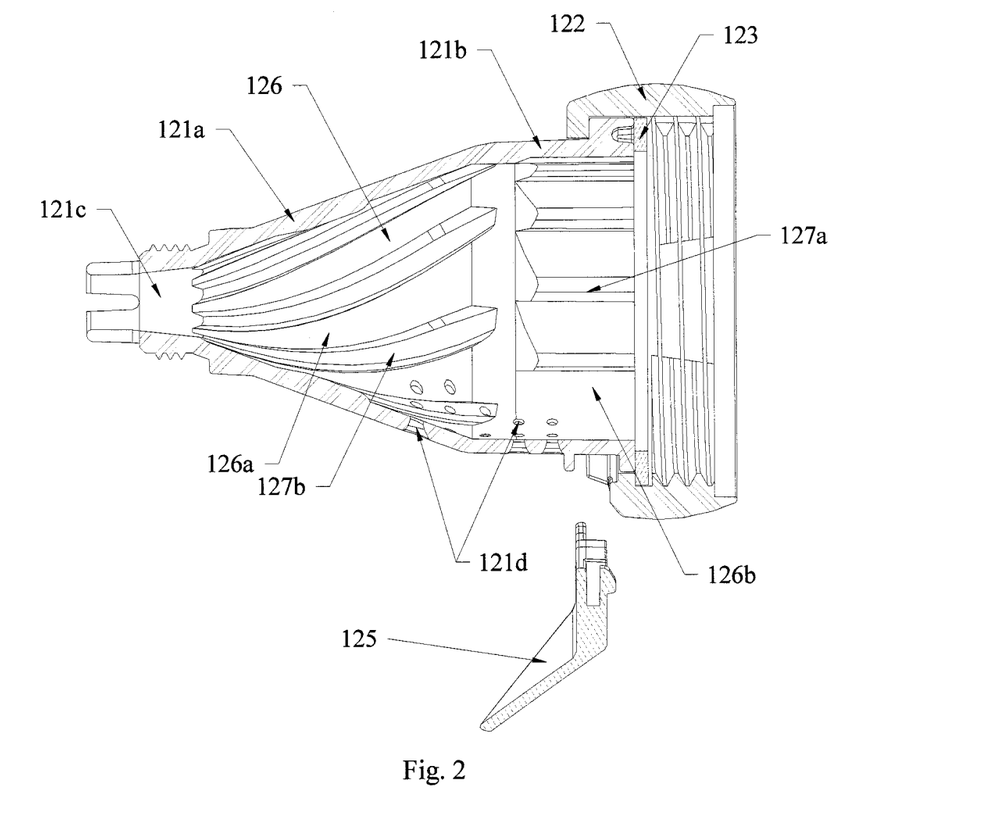
FIG. 2 is a partial sectional view of a head assembly of the multi-purpose juicer in accordance with an exemplary embodiment of the present invention.

FIG. 2 is a partial sectional view of the head assembly 120 of the multi-purpose juicer in accordance with an exemplary embodiment of the present invention. As shown in FIGS. 1 and 2, in the exemplary embodiment of the present invention, the head assembly 120 can include a head body 121, a jam nut 122, a seal gasket 123, a humidity regulator 124, and a guide plate 125. The head body 121 can include the processing cavity 126. As stated above, the combination of the processing cavity 126 and the transferring cavity 115 of the frame body form the operation cavity. In detail, the head body 121 can include a cone-shaped processing zone 121a and a connection zone 121b, which are aligned or matched with the transferring zone 111 of the frame body 110. The connection zone 121b and the transferring zone 111 of the frame body 110 are secured or connected together by the jam nut 122. In one exemplary embodiment, the processing cavity 126 is divided into two portions. These two portions includes a cone-shaped cavity 126a arranged in the processing zone 121a and a connection cavity 126b arranged in the connection zone 121b. The cone-shaped cavity 126a and the connection cavity 126b are aligned with or matched with the transferring cavity 115 of the frame body 110. The connection cavity 126b can include lateral guiding ribs 127a that are formed on its walls. The number and shape of the lateral guiding ribs 127a can be the same as the number of the lateral guiding ribs formed on the walls of the transferring cavity 115 of the frame body 110. Preferably, the lateral guiding ribs 116 of the transferring cavity 115 and the lateral guiding ribs 127a of the connection cavity are consecutive. This arrangement allows the material to smoothly enter the processing cavity 126 from the transferring cavity 115. Additionally, the cone-shaped cavity 126a of the processing zone can include spiral guiding ribs 127b. The number of the spiral guiding ribs 127b can be the same as the number of the lateral guiding ribs 127a.

In an exemplary embodiment of the present invention, the processing zone 121a of the head body 121 can include a locating central hole 121c. The locating central hole 121c can be arranged in a top portion of the cone-shaped cavity. Preferably, the locating central hole 121c is aligned with or matched with a locating terminal 131b of the function element such that the locating terminal 131b can be rotated. The locating central hole 121c of the head body 121 and the drive-connecting hole 113 of the frame body 110 can be rotatably cooperate with the function element that is rotatably located in the operation cavity.

The walls of the processing cavity 126 of the head body 121 can also include plug holes 121d to conveniently outflow the processed juice or minced meat. To ensure that the plug holes 121d are arranged in the lowest location of the processing cavity 126, locating fasteners 128 are arranged on the head assembly 120 between the head body 121 and the frame body 110, A seal gasket 123 can be positioned between the head body 121 and the frame body 110 to prevent the juice from leaking at this connection. Preferably, seal gasket 123 is compressed when the jam nut 122 securely connects the head body 121 with the frame body 110, more preferably jam nut 122 fixes the head body at a terminal/end of the frame body.

To collect and guide the juice or minced meat flowed from the plug holes 121d, a guide plate 125 can be arranged under the plug holes 121d of the head body 121. The guide plate 125 may be fixed on an outer wall of the head body 121 under the plug holes 121d via a fastener structure. The guide plate 125 can be oblique, such that the juice or minced meat can flow into a collecting container along the guide plate 125.

Figure 3:
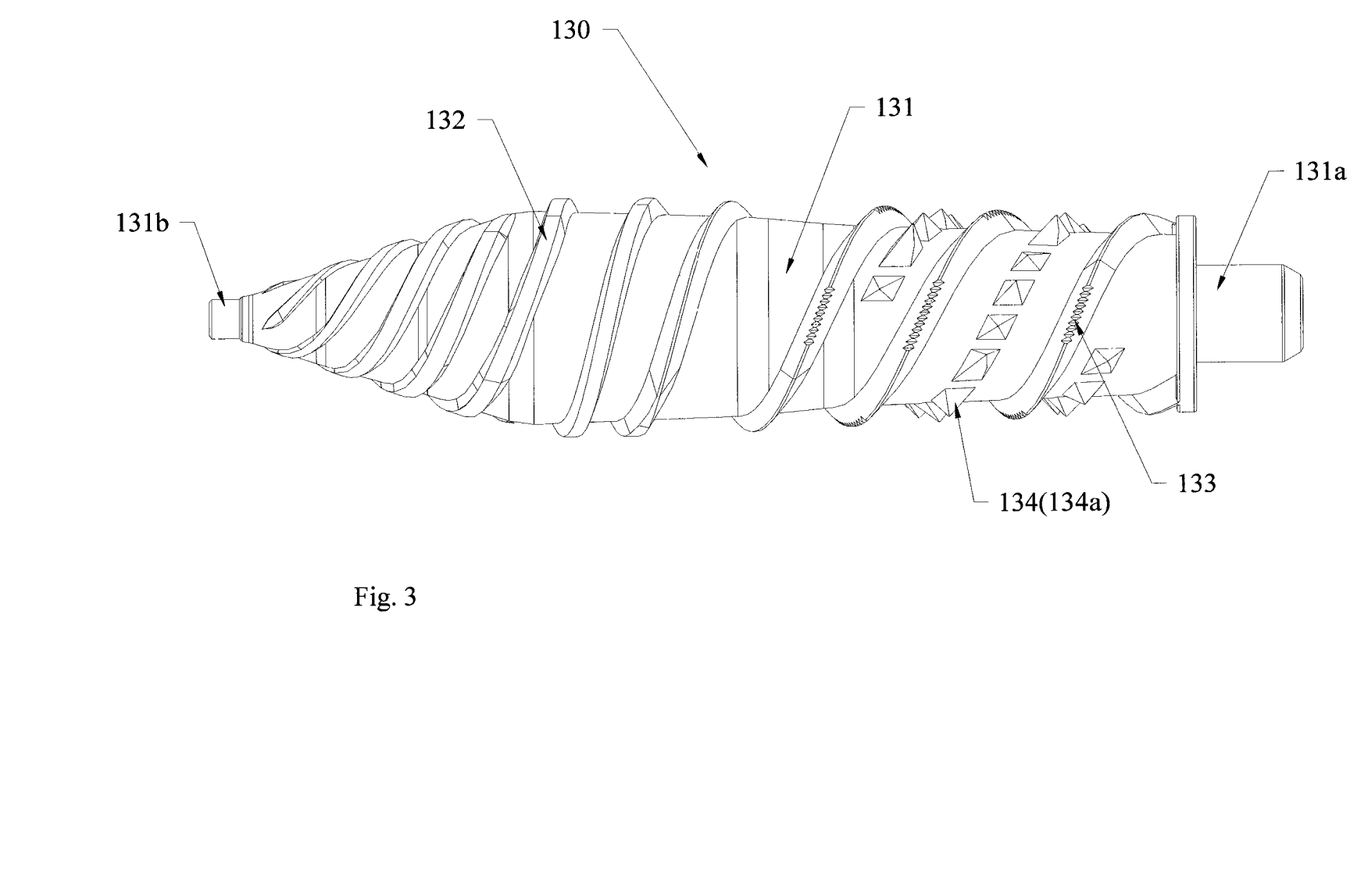
FIG. 3 is a structure schematic view of a juicing threaded rod of the multi-purpose juicer in accordance with an exemplary embodiment of the present invention.
Figure 3A:
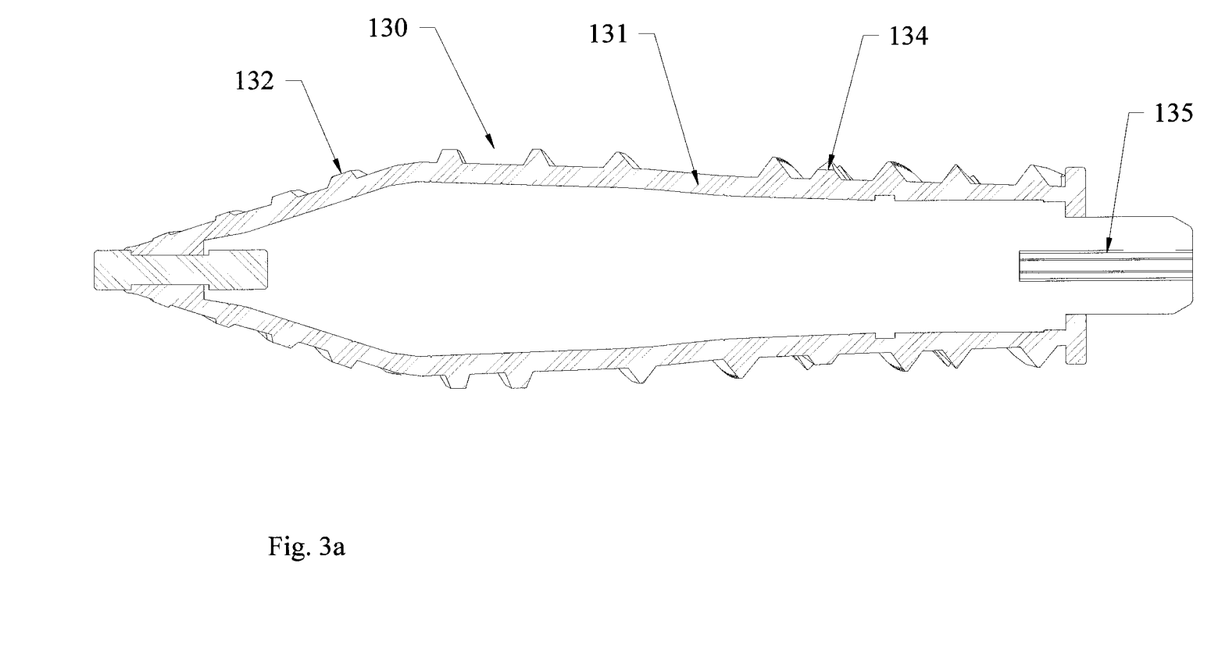
FIG. 3a is a partial sectional view of FIG. 3 in accordance with an exemplary embodiment of the present invention.

In the multi-purpose juicer of the present invention, the function element is configured for transferring and squeezing the material in the processing cavity 126. Different function elements with different functions and standards can be used depending on the need of a user. For example, a juicing threaded rod can be configured for performing the juicing function as the function element. FIG. 3 illustrates a structure schematic view of a juicing threaded rod of the multi-purpose juicer in accordance with an exemplary embodiment of the present invention and FIG. 3a is a half sectional view of FIG. 3. As shown in FIGS. 3 and 3a, in one exemplary embodiment, the juicing threaded rod 130 can be a demountable juicing threaded rod and can include a driving terminal 131a, a locating terminal 131b, a rotation shaft 131 arranged in the operation cavity, and a spiral wale 132 arranged on a surface of the rotation shaft 131. The driving terminal 131a of the rotation shaft 131 can pass through the drive-connecting hole 113 of the frame body 110 to cooperate with the drive assembly 300. The locating terminal 131b of the rotation shaft 131 can be rotatably arranged in the locating central hole 121c of the head body. The locating terminal 131b can include a shape that matches with the shape of the processing zone 121a of the head body 121, and it is preferably cone-shaped. Preferably, the spiral wale 132 extends from the driving terminal 131a to the locating terminal 131b of the rotation shaft. Of courses, a plurality of spiral wales which are spaced in a same distance from each other can be formed on the surface of the rotation shaft 131.

When the drive assembly 300 drives the juicing threaded rod 130 to rotate in the operation cavity, the spiral wale 132 generates a thrust force that moves the material towards the head body 121, such that the material slips towards the processing cavity 126 of the head assembly. When the material reaches the processing zone 121a of the head body 121, the spiral wale 132, which is arranged on the cone-shaped surface of the locating terminal 131b of the rotation shaft, and the walls of the processing cavity 126 of the head body cooperate together to squeeze and juice the material.

As shown in FIG. 3, the outer side surface of the spiral wale 132 can include a tooth-shaped surface 133. It is best that the tooth-shaped surface 133 is arranged on a portion of the spiral wale 132 corresponding to the transferring zone 111 of the frame body, to increase the speed of breaking the material. Preferably, a plurality of tooth-shaped surfaces 133 may be formed on the outer side surface of the spiral wale 132.

Figure 5:
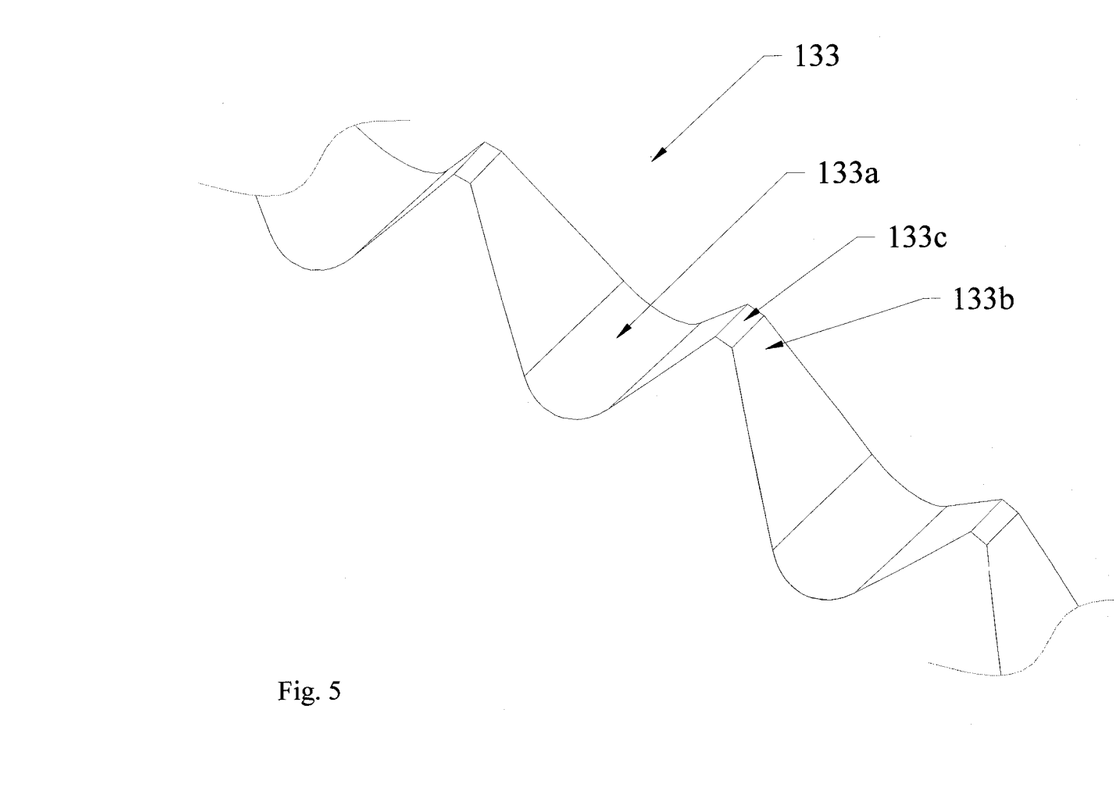
FIG. 5 is a partial structure schematic view of a tooth-shaped surface of the multi-purpose juicer in accordance with an exemplary embodiment of the present invention.

FIG. 5 is a partial structure schematic view of a tooth-shaped surface of the multi-purpose juicer in accordance with an exemplary embodiment of the present invention. As shown in FIG. 5, the top of each tooth of the tooth-shaped surface 133 is arranged at an outer convex surface of the spiral wale 132 (i.e., a plurality of grooves 133a are formed in the spiral wale 132 to form teeth 133b. Accordingly, the top/apex 133c of each tooth is formed by the outer convex surface of the spiral wale 132. In one example, given that the spiral wale 132 rotates in the operation cavity along with the rotation shaft, the top 133c of each tooth of the tooth-shaped surface may be abraded.

In the exemplary embodiment, a spiral outthrust group 134 is added on the surface of the shaft 131. The outthrust group 134 can be arranged at an interval of the spiral wale 132 to further increase the speed of breaking the material. In detail, as shown in FIG. 3, the spiral outthrust group 134 includes a plurality of outthrusts 134a. Each of the plurality of outthrusts 134a can be protruded outwards along a radial direction of the rotation shaft. Preferably, each of the outthrusts 134a is shaped similar to a triangular pyramid. The plurality of outthrusts 134a can be arranged together in sequence to form a spiral. Preferably, the space between the spiral outthrust group 134 and the spiral wale 132 is equal (i.e., the spiral line on which the plurality of outthrusts 134a are arranged, is spaced from an up portion and an adjacent low portion of the spiral wale 132 with the same distance). Preferably, the spiral outthrust group 134 is arranged on a portion of the rotation shaft 131 that corresponds to the feeding zone 112 of the frame body 110. This arrangement allows the material entered from the feeding zone 112 to be squeezed by the spiral outthrust group 134 to break into small particles before being transferred to the head body 121 by the spiral wale 132 of the rotation shaft.

In an exemplary embodiment, the head assembly 120 further includes a humidity regulator 124 (as shown in FIG. 1) arranged on the head body 121. The humidity regulator 124 may adjust the location of the function element in an axial direction in relation to the head body 121. In detail, as shown in FIG. 1, the humidity regulator 124 is arranged at an outer end/terminal of the head body 121 and corresponds to the locating central hole 121c. The humidity regulator 124 may be a regulating nut 124a whose threads cooperate with the head body 121. When the locating terminal 131b of the juicing threaded rod is inserts into the locating central hole 121c of the head body, the locating terminal 131b is positioned axially by the regulating nut 124a. Adjusting the regulating nut 124a in relation to the head body 121, can result in adjusting the axial location of the juicing threaded rod 130 in relation to the head body 121. The adjustment of the axial location of the juicing threaded rod 130 adjusts the interval between the zone-shaped surface of the locating terminal 131b of the juicing threaded rod and the wall of the inner zone-shaped cavity of the head body 121. This in turn controls the degree the material being squeezed to perform the humidity controlling function.

Figure 4:
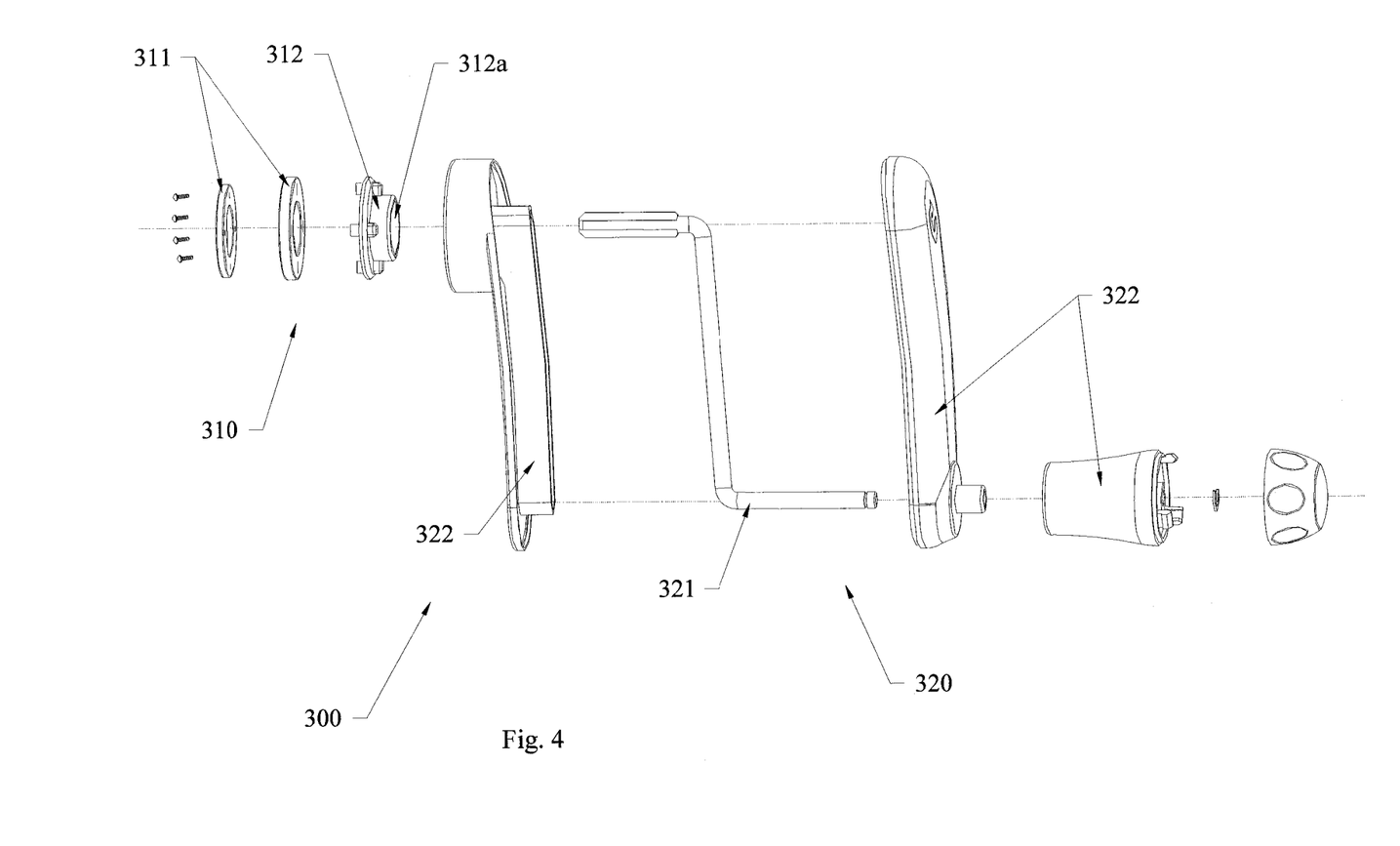
FIG. 4 is an exploded schematic view of a drive assembly of the multi-purpose juice in accordance with an exemplary embodiment of the present invention.

In an exemplary embodiment, the drive assembly 300 is arranged at a side of the frame body 110, for driving the function element in the operation cavity. FIG. 4 is an exploded schematic view of a drive assembly of the multi-purpose juice in accordance with an exemplary embodiment of the present invention. In detail, as shown in FIG. 4, the drive assembly 300 includes a rotatable supporter 310 and a handle group 320. The rotatable supporter 310 can include two gaskets 311 fixed on the drive-connecting hole 113 of the frame body. Additionally, the rotatable supporter 310 can include a connection block 312 having a driving hole 312a formed thereon. The connection block 312 can be fixed on the gaskets 311. The handle group 320 includes an insert-driving hole 312a, a rocker 321 connected with the function element, and a handle housing 322 configured for containing the rocker 321. A counter-bored hole 135 is formed in the driving terminal 131a of the function element in which the rocker 321 is inserted. Preferably, the shape of the counter-bored hole 135 matches with an inserting terminal/end of the rocker 321, such as a cross-shaped hole, so that the rocker 321 can drive the function element to rotate. Preferably, the rocker 321 is fixed in the handle housing 322. The handle housing 322 can be matched/aligned with the shape of the rocker 321 and be conveniently held by hands of a user to conveniently operate the device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-purpose juicer, comprising:
a frame assembly;
a base assembly arranged under the frame assembly; and
a drive assembly arranged at a side of the frame assembly;
wherein the frame assembly includes a frame body, a head assembly fixed on the base assembly, and a function element, and wherein the frame body includes (i) a bottom that matches with the base assembly, (ii) a first end that matches with the head assembly to form an operation cavity configured for receiving the function element, (iii) a second end that matches with the drive assembly, and wherein the drive assembly drives the function element to operate in the operation cavity;
wherein the frame body comprises a lateral cylinder-shaped transferring zone and a feeding zone arranged on the transferring zone;
wherein lateral cylinder-shaped transferring zone comprises a transferring cavity that is in communication with the feeding zone, wherein the head assembly includes a processing cavity, wherein the combination of the transferring cavity and the processing cavity form the operation cavity;
wherein the functional element further comprises a demountable juicing threaded rod comprising a rotation shaft rotatably arranged in the operation cavity, and a spiral wale arranged on a surface of the rotation shaft;
wherein the spiral wale comprises an outer convex and wherein a portion of the outer convex includes a tooth-shaped surface that corresponds to the transferring zone of the frame body and at an end of the functional element that corresponds to the driving assembly; and
wherein the tooth-shaped surface includes a top that is arranged in the outer convex surface of the spiral wale wherein the rotation shaft comprises a spiral outthrust group that is arranged on it surface and in an interval with the spiral wale.

2. The multi-purpose juicer according to claim 1, wherein the head assembly comprises a head body cooperating with the frame body to form the operation cavity, a jam nut configured to fix the head body at a terminal of the frame body, and a seal gasket arranged between the head body and frame body.

3. The multi-purpose juicer according to claim 1, wherein the processing cavity comprises plug holes on its walls and wherein a plurality of locating fasteners are arranged between the head body and the frame body to position the plug holes at a lowest location of the processing cavity.

4. The multi-purpose juicer according to claim 3, wherein the head body further comprises a guide plate arranged under the plug holes.

5. The multi-purpose juicer according to claim 2, wherein the function element comprises a locating terminal cooperating with the head body and a driving terminal cooperating with the drive assembly, a locating central hole is arranged in the head body and rotatably cooperates with the locating terminal of the function element, and a drive-connecting arranged in the frame body and rotatably cooperates with the driving terminal of the function element.

6. The multi-purpose juicer according to claim 2, wherein the head assembly further comprises a humidity regulator arranged on the head body, and wherein the humidity regulator is configured to adjust a location of the function element in an axial direction in relation to the head body.

7. The multi-purpose juicer according to claim 1, wherein the drive assembly is arranged at a side of the frame body and comprises a rotatable supporter fixed on the frame body and a handle group, wherein the handle group is rotatably arranged in the rotatable supporter and is connected to a driving terminal of the function element.

8. The multi-purpose juicer according to claim 1, wherein the transferring cavity includes an inner wall comprising lateral guiding ribs thereon.

* * * * *